United States Patent [19]

Kagamibashi et al.

[11] Patent Number: 5,508,986
[45] Date of Patent: Apr. 16, 1996

[54] INFORMATION RECORDING, REPRODUCING APPARATUS HAVING OPERATION MODE SWITCHING MEANS

[75] Inventors: Syunji Kagamibashi; Yoshimitsu Nakamura, both of Neyagawa; Isao Obata, Nara; Takaharu Ai, Sakai; Shoji Hasegawa; Seizou Tsuji, both of Hirakata, all of Japan

[73] Assignee: Matsushita Electric Industrial Co., Ltd., Osaka, Japan

[21] Appl. No.: 66,881

[22] Filed: May 25, 1993

[30] Foreign Application Priority Data

May 25, 1992 [JP] Japan .................................. 4-132138

[51] Int. Cl.⁶ ........................................................ G11B 7/00
[52] U.S. Cl. ............................ 369/54; 369/32; 369/33; 369/47
[58] Field of Search ................................ 369/47, 54, 32, 369/33, 30, 58, 43, 48; 395/475

[56] References Cited

U.S. PATENT DOCUMENTS 4,779,252 10/1988 Custers et al. .................. 369/30 X
4,841,506 6/1989 Kiyoura et al. .................. 369/32
5,233,588 8/1993 Tabuchi ........................... 369/47
5,237,558 8/1993 Horikiri et al. .................. 369/116
5,260,801 9/1993 Temma et al. ................... 369/47

FOREIGN PATENT DOCUMENTS 0641186 3/1989 Japan ............................... 369/32

Primary Examiner—Aristotelis Psitos
Assistant Examiner—Thang V. Tran
Attorney, Agent, or Firm—Ratner & Prestia

[57] ABSTRACT

An information recording, reproducing apparatus comprising a first operation switch, a memory for storing a plurality of operation modes with operation steps for controlling the information recording, reproducing operation with the instructions from the control apparatus, a selecting apparatus for selecting a selecting mode, and a switching apparatus for selecting one operation mode from among the plurality of operation modes, where selection of an operation mode among from the plurality of operation modes is performed after a selection mode has been selected.

15 Claims, 10 Drawing Sheets

INFORMATION RECORDING, REPRODUCING APPARATUS HAVING OPERATION MODE SWITCHING MEANS

BACKGROUND OF THE INVENTION

The present invention generally relates to an information recording, reproducing apparatus, and more particularly, to an information, recording, reproducing apparatus for recording, reproducing information on a disk shaped recording medium and a card shaped recording medium and an operation mode switching means for a matching property of superior control apparatus as represented by a host computer.

Since optical disks are higher in recording density and can be recorded, reproduced with non-contact in recent years, they are longer in the service life of the medium, are considerably faster at random access in performance as compared with a medium such as tape or the like. Many propositions are provided such as a CD (Compact Disk) with audio signals as a reproducing exclusive machine being recorded digitally on it, a VLP with video and audio signal of pictures and so on being recorded on it, a picture image file as a recording, reproducing machine, a data file, a document file and so on. Especially, data files using optical disks are used as large capacity removable media or as substitutes of fixed magnetic disks, which is generally called as a hard disk under the control of many generalized system control programs (hereinafter referred to as OS) by a specific computer manufacturer such as UNIX, MS-DOS or the like.

A method of corresponding the information recording, reproducing apparatus to a different specification for each OS of many types as described hereinabove comprises steps of arranging, exchanging as many as necessary what stored the respective OS executive softwares in the ROM and so on of one chip, of arranging, mounting the control program of the apparatus provided with all the specifications corresponding to the respective types of OS, of operating switches for transferring use provided in the apparatus interior, of switching the mode and using it. As one example, a dip switch or a jumper switch on the apparatus printed circuit board is used as a switching means to specifications corresponding to the respective types of OS. The present invention relates to improvements in the following characteristics of the information recording, reproducing apparatus having the above described operation mode switching means.

One example of the information recording, reproducing apparatus having the conventional mode switching means will be described hereinafter with reference to the drawings.

FIG. 12 is a block diagram of an optical disk recording, reproducing apparatus as an information recording, reproducing apparatus having the conventional mode switching means, and shows one embodiment of the general construction of the optical disk recording, reproducing apparatus which is an information recording, reproducing apparatus.

In FIG. 12, reference number 21 is a disk shaped recording medium (hereinafter referred to as optical disk) which is a medium capable of recording, reproducing the above described data, reference number 22 is a recording, reproducing head which is the recording, reproducing means for effecting the recording or reproducing operation, reference number 23 is a disk motor for rotating the above described optical disk, reference number 24 is a recording, reproducing head control portion for effecting the positional controlling operation of the above described recording, reproducing head, reference number 25 is a signal processing portion for effecting demodulation of the signal to be reproduced by the above described recording, reproducing head, and effecting modulation for recording with the above described recording reproducing head, reference number 26 is an apparatus control portion for giving an instruction to the above described disk motor, the above described recording, reproducing head control portion, and the above described signal processing portion, reference number 27 is an interface for communication with the host computer 28 as the higher control apparatus, reference number 29 is an ID switch for setting the selection identification address from the host computer. Reference number 30 is an ejection switch for ejecting the optical disk. Reference numbers 31, 32 are dip switches to be mounted on the print basic plate and so on within an apparatus for effecting a mode switching operation.

FIG. 13 explains the internal construction of an apparatus control portion 26 in the conventional embodiment. Reference number 26-1 is a CPU for effecting of the execution of the program to be preserved in the ROM 26-3. Reference number 26-2 is a RAM for temporarily storing the data to be fed from the host computer, and for using as a data buffer for effecting the production and so on of the error correction/error correcting information in the recording operation on the optical disk or in the feeding operation to the host computer the data read out from the optical disk, reference number 26-4 is a control signal input, output portion to be connected with a disk motor 23, a recording, reproducing control 24, an ID switch 29, an ejection switch 30, a dip switch 31 for an operation mode setting use, a dip switch 32 for operation mode setting use, and so on.

An information recording, reproducing apparatus constructed as described hereinabove will be described hereinafter in the operation mode switching operation.

In the present invention, the dip switch 31 is a switch for switching an optical disk specification mode and a fixed magnetic disk specification mode. When the operation mode switching is effected, the sheathing case of the apparatus is disengaged, the dip switch 31 mounted on a print basic plate and so on is closed, the sheathing case is engaged again, and thereafter, the mode is operated as the optical disk specification mode by the operation switch application. Open the dip switch 31 and put the operation supply switch to work, and the mode is operated as the fi re d magnetic disk specification mode.

The operation after the above described respective operation mode switching operations will be easily described. Report that it is a fixed magnetic disk to the host computer with the dip switch 31 being open, and the optical disk reproducing, reproducing apparatus can be used as a substitute of the fixed magnetic disk. As one example, when a standard for prescribing the connection relation (hereinafter referred to as interface) of the arrangement of the signal wire with respect to the superior control apparatus, and signal forms and so on are SCSI-2 (ANSI X3. 131-199X standard), the disk is recognized as a fixed magnetic disk if DEVICE TYPE in the "INQUIRY data" to be returned with the "INQUIRY command" for declaring the operation mode of the apparatus on the superior control apparatus is 00H, and a disk is recognized as an optical disk if is 07H.

In order not to take out the recording medium with the above described INQUIRY command being different, the condition of the apparatus being the same as in the fixed magnetic disk, the mode is operated as a manual ejection prohibition mode with the dip witch 32 being closed. The manual ejection prohibition mode is a mode for prohibiting it, because a problem is generated when the medium is ejected during the use if it is used as the fixed magnetic disk.

In a system capable of recognition as the optical disk of the portable medium as in, for example, MS-DOS and so on by the combination of the above described dip switches 31, 32, the optical disk specification mode, the manual ejection permission mode are set and used as an operation mode open both in the dip switches 31, 32. In the case of the system where the optical disk is recognized as a fixed magnetic disk like, for example, UNIX, an operation mode is selected with both the dip switches 31, 32 being closed, they are used as the fixed magnetic disk specification mode and the manual ejection prohibition mode. The unnecessary medium election is prohibited and the disk may be used as the fixed magnetic disk.

in the construction of the information recording, reproducing apparatus having the above described conventional operation mode switching means, more operation modes cannot be switched with restrictions to the dip switch or jumper switch to be arranged on the apparatus printed circuit board. Further, there are cases where the dip switch or jumper switch for operation mode switching exclusive use cannot be disposed on the apparatus printed circuit board by the smaller size, thinner size of the apparatus. The sheathing case of the apparatus has to be opened and the apparatus main chassis has to be taken out for the operation mode switching.

SUMMARY OF THE INVENTION

Accordingly, the present invention has been developed with a view to substantially eliminating the above discussed drawbacks inherent in the prior art, and has for its essential object to provide an improved information recording, reproducing apparatus.

Another important object of the present invention is to provide an improved information recording, reproducing apparatus having an operation mode switching means without the arrangement requirement of a dip switch for operation mode switching executive use or a jumper switch on the apparatus printed circuit board, or without requirement of opened sheathing case of the apparatus for switching operation of the operation mode, thus realizing the mounting operation of the switching means of more operation modes.

In accomplishing these and other objects, according to one preferred embodiment of the present invention, there is provided an information recording, reproducing apparatus, having an operation mode switching means, which is connected with the superior control apparatus and is adapted to record, reproduce the information on the information recording medium, comprising a operation switch for feeding operation and a first operation switch, a plurality of operation modes where operation steps for controlling the information recording, reproducing operations are stored with instructions from the superior control apparatus, a selecting means for selecting one operation mode from among the above described plurality of operation modes, construction of having an operation mode switching means capable of selecting an optional operation mod among the plurality of operation modes by the operation of the above described first operation switch after the above described selection condition with the above described selecting means being an operating selection condition by the specific operation of the above described first operation switch, construction of having a second operation switch in addition to the above described construction, and further construction having a displaying means.

The present invention has a means of recording a control program corresponding to the above described operation mode on the specific area of the optical disk so as to distribute it, and reading out the control program to be selected from the optical disk so as to change it.

An operation mode switching means is put into a selective condition by the make and break number of times or the make and break period of the above described first operation switch, and the combination thereof by the construction, an operation is effected so that the inner, an optional operation mode among a plurality of operation modes may be selected by the first operation switch.

An operation is effected so that an optional operation mode among a plurality of operation modes may be selected by a operation supply switch, an operation mode switching means of becoming selective by the make and break number of times or the beak and break period of the first operation switch and the combination thereof, and the make and break number of times or the make and break period of the first operation switch and the combination thereof, and the make and break condition of the above described second operation switch.

An information recording, reproducing apparatus is provided which is capable of switching many operation modes without provision of a dip switch or a jumper switch for mode switching use on the apparatus printed circuit board and without an opening operation of the sheathing case of the apparatus and a taking out operation of the apparatus main chassis by such construction as described hereinabove. A corresponding operation into many types of superior types of machines can be effective by the closing number of times and time, the arrangement and so on of the first or second operation switch, the extremely simple operation thereof. The kind of application for usage of the apparatus can be enlarged.

The control program of the apparatus is changed into the control program read out from the optical disk so that the corresponding operation into the unexpected operation mode can be effective at the manufacturing time.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numbers through the accompanying drawings.

The present invention will be described hereinafter in its one embodiment with reference to the drawings.

Figure 1:
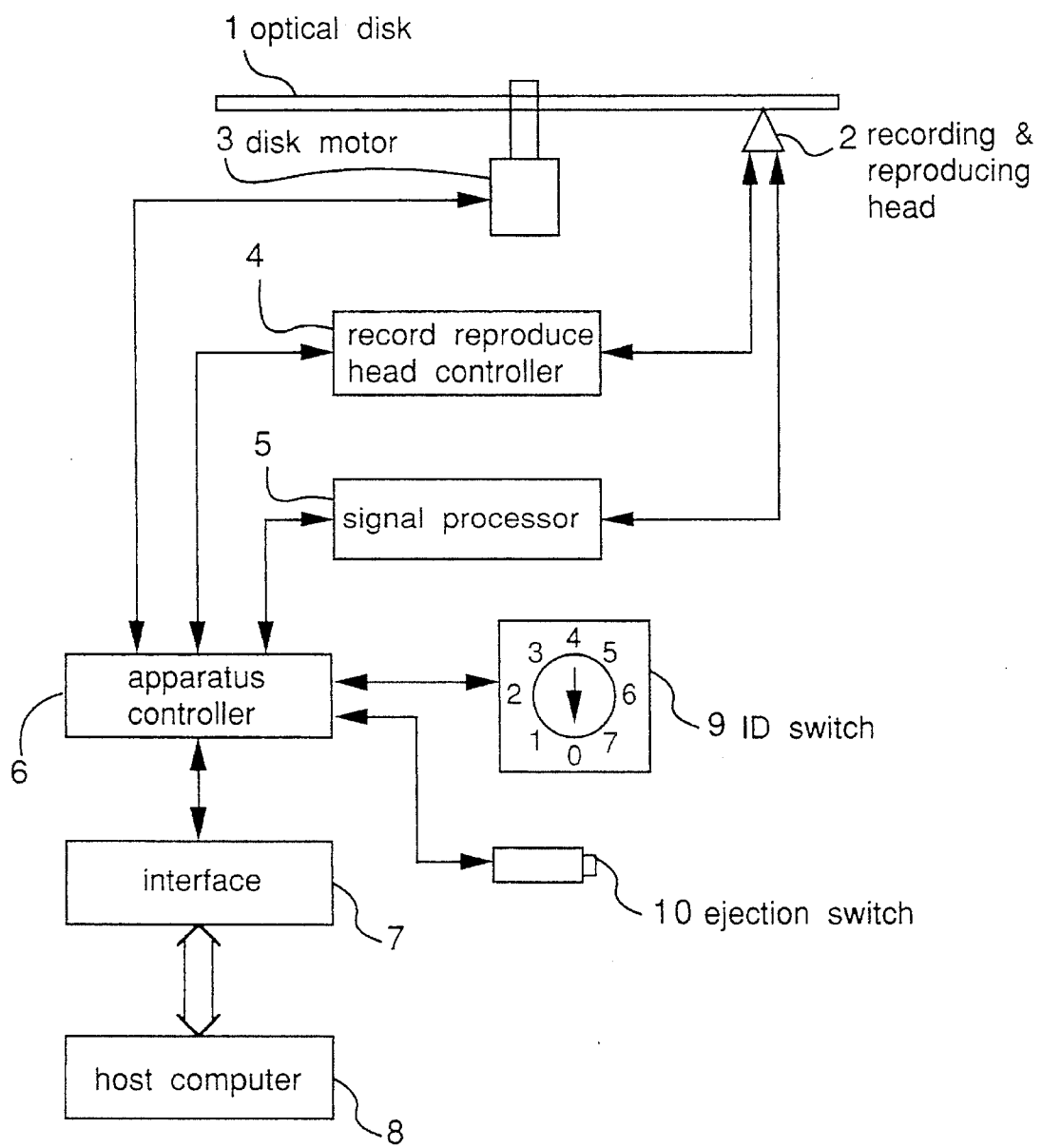
FIG. 1 is a block diagram of an optical disk recording, reproducing apparatus in first, second embodiments of the present invention.

FIG. 1 is a block diagram of an optical disk recording, reproducing apparatus in a first embodiment of the present invention. FIG. 1 shows one embodiment of the general construction of an optical disk recording, reproducing apparatus which is an information recording, reproducing apparatus. In FIG. 1, reference number 1 is an optical disk which is a medium capable of effecting a recording, reproducing operation of the above described data, reference number 2 is a recording, reproducing head which is the recording, reproducing means for effecting a recording or reproducing operation, reference number 3 is a disk motor for rotating the above described optical disk, reference number 4 is a recording, reproducing head control portion for effecting the positional control of the above described recording, reproducing head, reference number 5 is a signal processing portion for demodulating signals to be reproduced by the above described recording, reproducing head and effecting modulation for recording the with the above described recording, reproducing head, reference number 6 is an apparatus control portion for issuing instructions to the above described disk motor, the above described recording, reproducing head control portion, the above described signal processing portion and an interface portion 7, reference number 7 is an interface portion for communicating with the host computer 8, reference number 9 is an ID switch for setting a selection identifying address from the host computer as a second operation switch, reference number 10 is an ejection switch for instructing the ejection of the optical disk as the first operation switch. The ID switch 9 may be a rotary switch, a jumper switch composed of a jumper wire or a dip switch.

An information recording, reproducing apparatus constructed as described hereinabove will be described hereinafter with reference to FIG. 1, FIG. 2, FIG. 3 and FIG. 4 by way of cases where an operation mode is set in the respective mode of optical disk specification mode/fixed magnetic disk specification mode (which is a specification mode of hard disk) and manual ejection possible mode/manual ejection prohibition mode.

Figure 2:
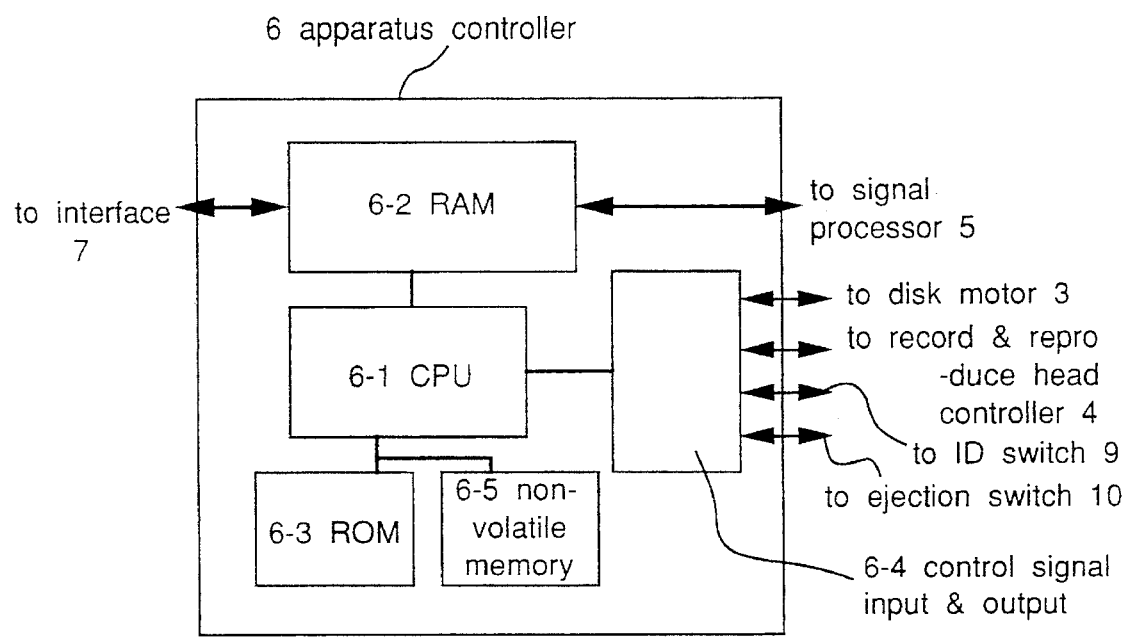
FIG. 2 is a detailed block diagram of an apparatus control portion in the first, second embodiments of the present invention.

FIG. 2 explains the inner construction of an apparatus control portion 6 in the present embodiment. Reference number 6-1 is a CPU for executing a program which is preserved in a ROM 6-3, reference number 6-2 is a RAM to be used as a data buffer which is adapted to produce the error correction/error correction information of the data, reference number 6-4 is a control signal input, output portion to be connected with a disk motor 3, a recording, reproducing control portion 4, an ID switch 9, an ejection switch 10 and so on, reference number 6-5 is a nonvolatile memory for preserving the program.

Figure 3:
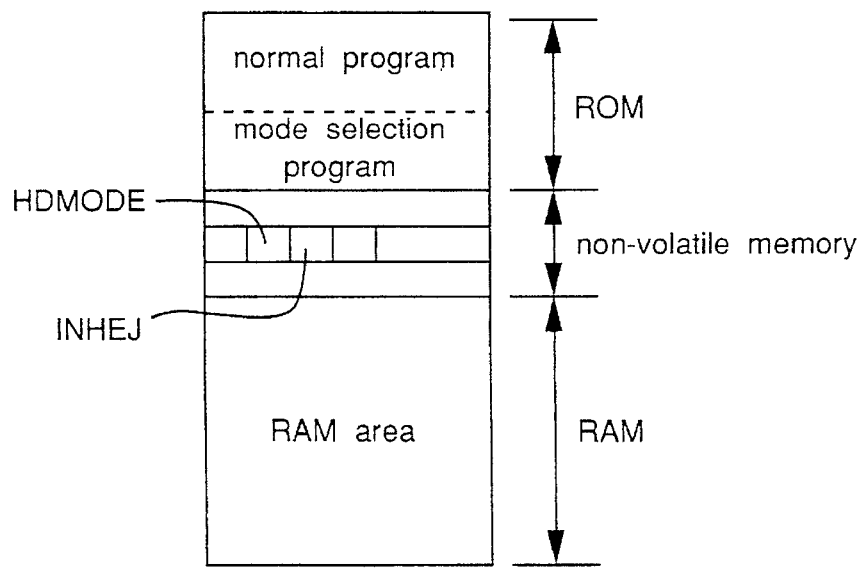
FIG. 3 is a memory arrangement view within the apparatus control portion in the first, third embodiments of the present invention.

How the operation mode of the normal program is switched by the above described program switch which is a switching means within the selected apparatus control portion will be easily described hereinafter with the use of FIG. 3. FIG. 3 is a memory arrangement view of a program memory and a program switch. In FIG. 3, the ROM area is composed of the normal operation program and a mode selection program. A HDMODE and an INHEJ of a program switch which is a switching means within the apparatus control portion are arranged in one portion of the nonvolatile memory area. The HDMODE is a program switch for switching the fixed magnetic disk specification mode and the optical disk specification mode. When 1 is set in the HDMODE, the mode is operated as a fixed magnetic disk specification mode. When 0 is set, the mode is operated as an optical disk specification mode. The INHEJ is a program switch for switching the permission of the manual ejection and the prohibition mode. When the INHEJ is set in the 1, the manual ejection is prohibited. When it is set in the 0, the manual ejection is permitted.

Figure 4:
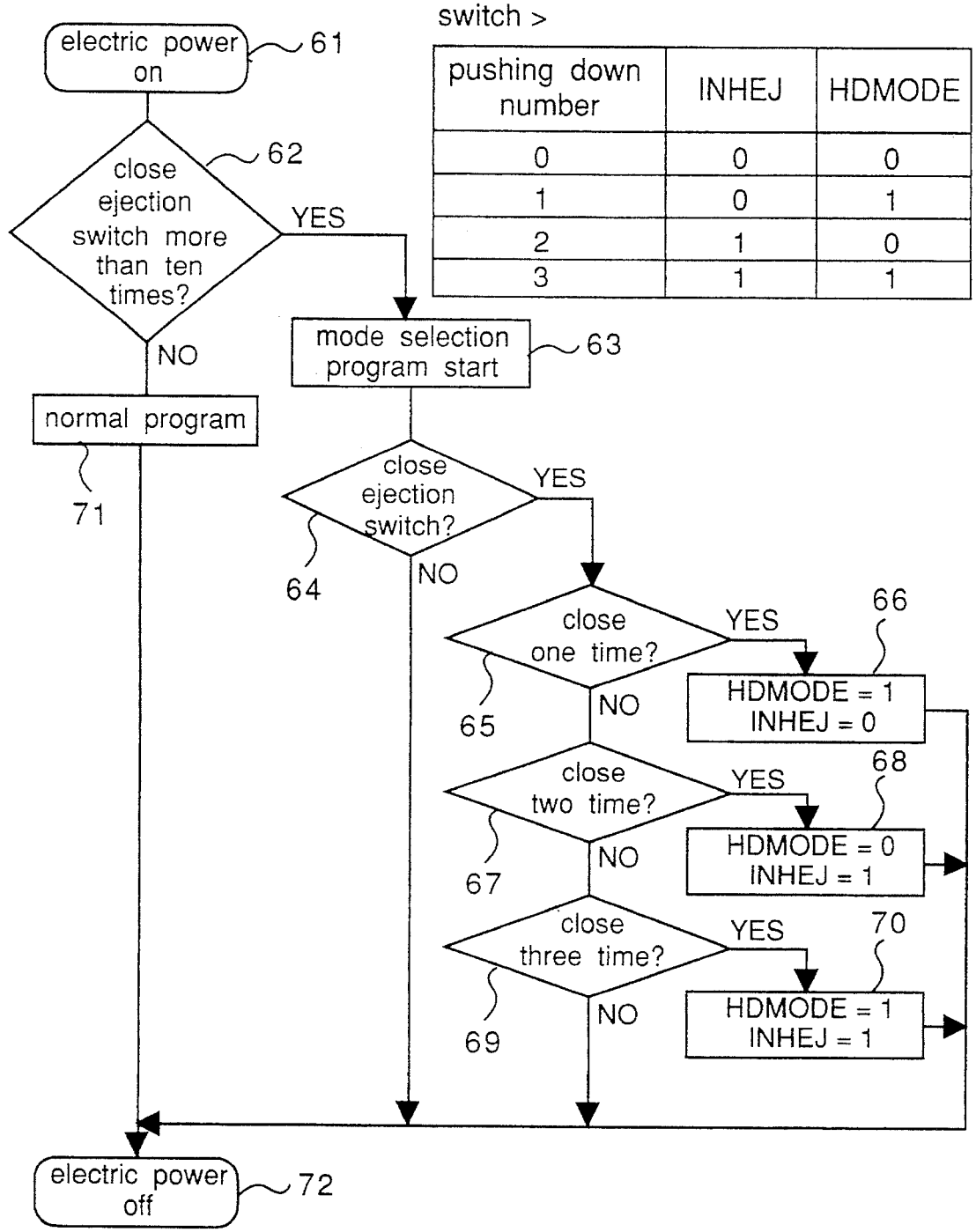
FIG. 4 is a flow chart of an operation mode selection in the first embodiment of the present invention.

FIG. 4 is an operation illustrating view for describing the operation of the mode selection program. After the operation supply is put to work, the ejection switch 10 is closed without across the other operation by a specific period for example ten times so that the condition becomes selective enough to switch the control operation mode. A specific operation mode is selected to a program switch which is a switching means within the apparatus control portion 6 so that the specific operation mode is made certain.

In FIG. 1 and FIG. 4, after the operation supply has been put to work at the step 61, the ejection switch 10 is closed without across the other operation by a specific number of times at the step 62. At a step 63, the mode selection program to be preserved in the ROM 6-3 of the apparatus control portion 6 is started so that the condition becomes selection enough to switch the control operation mode. It is judged in this condition whether or not the ejection switch 10 has been closed at a step 65. When the ejection switch has been closed, the number of times of the ejection switch 10 closed is judged at the step 65, the step 67, the step 69. The specific operation mode is selected to a program switch which is a switching means within the apparatus control portion 6 in accordance with the number of times, and the specific operation mode is made certain. When no change is desired from the initial condition, the optical disk specification mode, the manual ejection possible mode remains unchanged, and becomes initial if the operation supply is turned off without the close of the ejection switch 10. When the ejection switch 10 is closed one time, 1 is set in the HDMODE, 0 is set in the INHEJ within the nonvolatile memory 6-5 at the step 66 by the number of times decision of the step 65, the mode becomes a fixed magnetic disk specification mode, a manual ejection possible mode. When the ejection switch 10 is closed two times, 0 is set in the HDMODE, 1 is set in the INHEJ within the nonvolatile 6-5 at the step 68 by the number of times decision within the step 67, and the mode becomes an optical disk specification mode, a manual ejection prohibition mode. When the ejection switch 10 is closed three times, 1 is set in the HDMODE, 1 is set in the INHEJ within the nonvolatile memory 6-5 at the step 70 by the number of times decision within the step 69 and the mode becomes a fixed magnetic disc specification mode, a manual ejection prohibition mode.

Such all the combination portions of the respective operation modes or one portion specified as described hereinabove is outputted in response to the specific order of the superior control apparatus as the other function of the above described present invention, and the host computer which is the superior control apparatus can confirm the selected operation mode. Assume that the connecting operation is effected through the SCSI interface to the host computer, and the confirming operation can be effective from the host computer by the displaying of the operation mode displayed on the data to be returned by the command of obtaining the apparatus condition. By the function, it can know to which mode the permission, prohibition or the optical disk specification mode and the fixed magnetic disk specification mode of the manual ejection are selected from the host computer are selected. The other modes can be known from the host computer without the condition being made selective. It can execute the change in all the portions or one portion of the moving, operating mode to the above described selective condition from the host computer.

Figure 5:
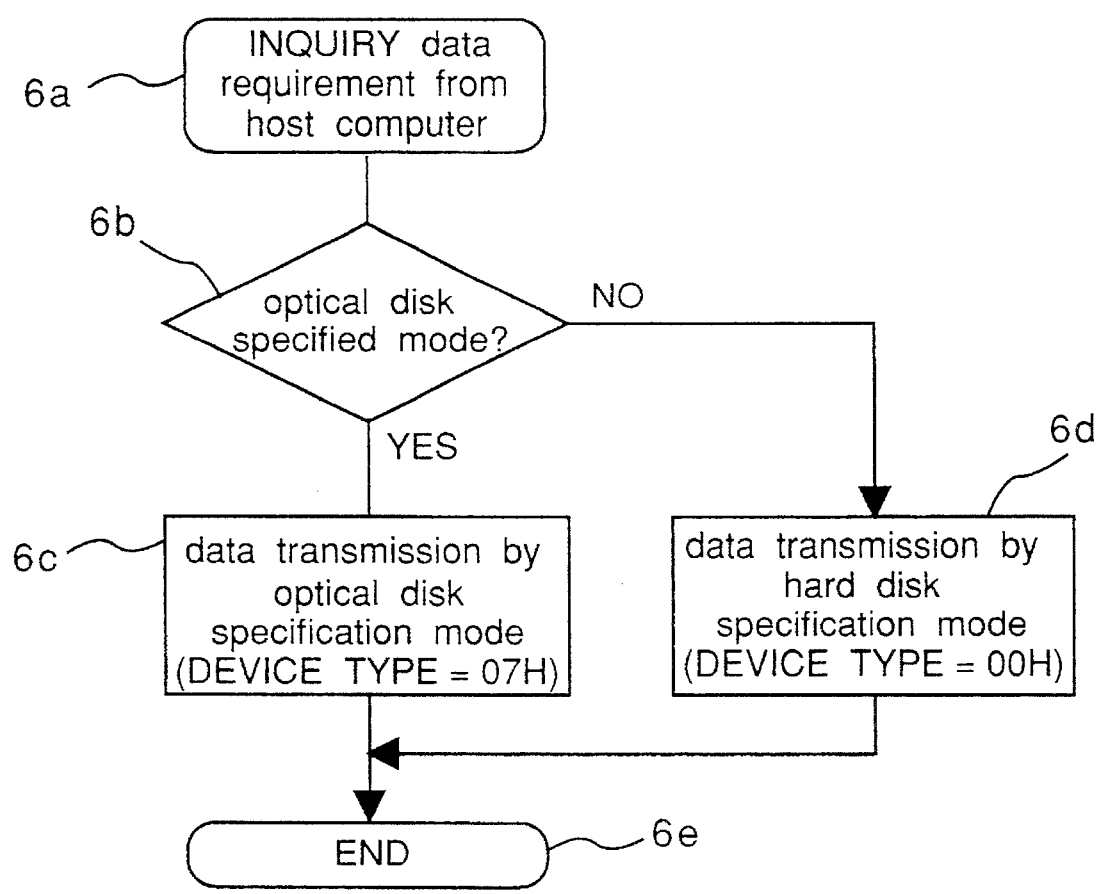
FIG. 5 is a flow chart of communication in the first embodiment of the present invention.

FIG. 5 shows the switching operation of the normal program of the fixed magnetic disk specification mode and the optical disk specification mode. When the INQUIRY data demand exists from the host computer, the step advances to a step 6a. The step advances to a step 6b. When the program switch is an optical disk specification mode, the step advances to a step 6c so as to produce the INQUIRY data of the optical disk specification. The "DEVICE TYPE= 07H" which is an optical disk specification mode is outputted through an interface line to the host computer so as to effect a transmitting operation. When it is set in the fixed magnetic disk specification mode, the step advances to a step 6d so as to produce the INQUIRY data of the fixed magnetic disk specification. A "DEVICE TYPE=00H" which is a fixed magnetic disk specification mode is outputted to the host computer so as to effect a transmitting operation. The step advances to a step 6e respectively so as to complete the processing operation with respect to the demand of the INQUIRY data.

Figure 6:
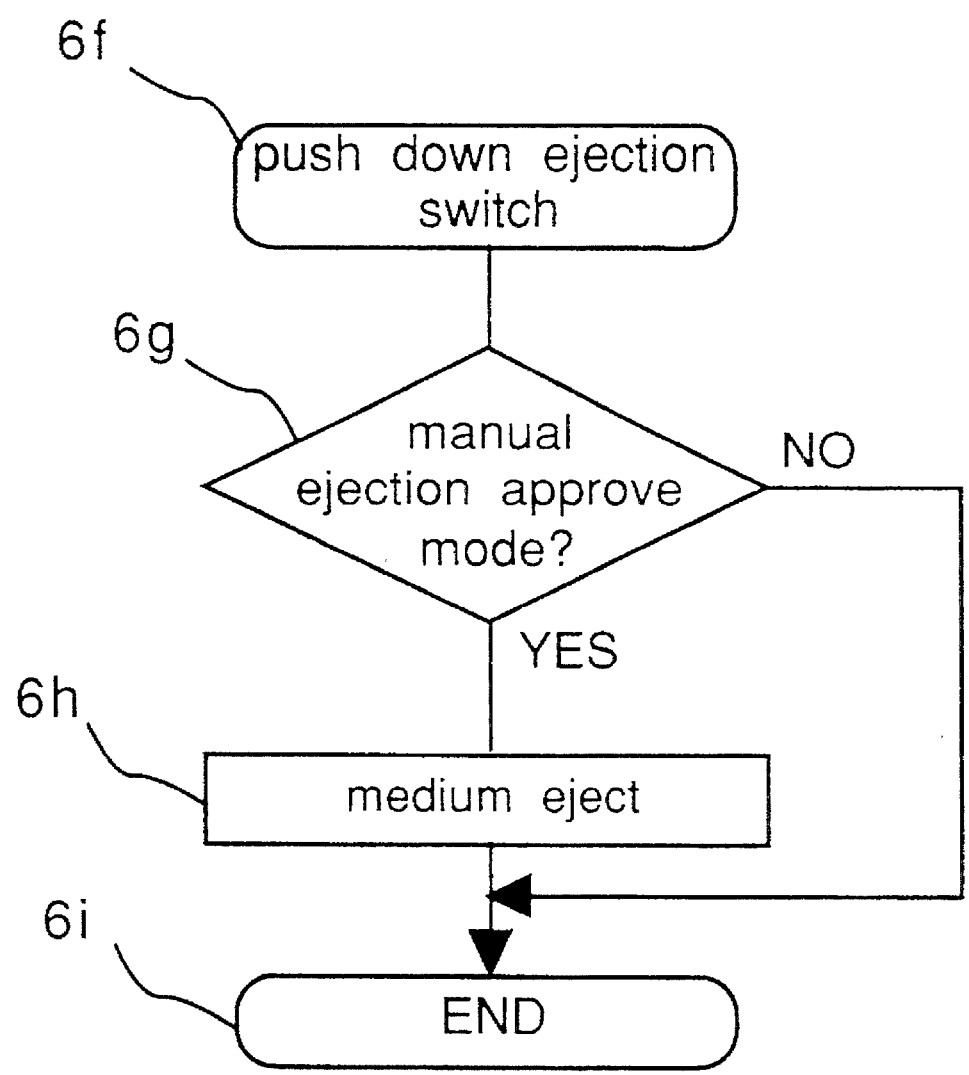
FIG. 6 is a flow chart of an ejection switch operation in the first embodiment of the present invention.

FIG. 6 shows the switching operation of the normal program of the manual ejection permission, prohibition mode. The ejection switch is closed, and the step advances to a step 6f. Then, when it is a manual ejection permission mode at the step 6g, the step advances to a step 6h so as to eject the medium. When it is a manual ejection prohibition mode at the step 6g, the step advances to a step 6i so as to complete the processing with respect to the ejection switch in the normal recording, reproducing condition.

Such a method as described hereinabove can be effective without the above described limitation as an operating method of an ejection switch 10 for changing over a program switch which is a switching means within the apparatus control portion after the selecting condition. Although the program switch has been changed over with the number of times of closing the ejection switch 10 in the above described example, the period of keeping closing the ejection switch can be changed over in accordance with the correspondence to the respective operation mode. After the selecting condition of, for example, the optical disk specification mode and the fixed magnetic disk specification mode and so on, the mode becomes a fixed magnetic disk specification mode when the ejection switch 10 is closed one second in this condition and the mode becomes an optical disk specification mode when it is closed for three seconds. When the ejection switch 10 is closed for 5 seconds or more one time, the mode becomes a manual ejection possible mode. When the ejections switch is closed for seven seconds or more, the mode may be made a manual ejection prohibition mode. The period of keeping closing it is sufficient if the period is provided so that the selection of each mode may not go wrong.

The combination of the above described number of times and the period may be effective as the operating method of the other ejection switches. After the selective condition of, for example, the optical disk specification mode and the fixed magnetic disk specification mode, the mode becomes a fixed magnetic disk specification mode when the ejection switch 10 is closed one period in this condition, and becomes an optical disk specification mode if closed twice. When the ejection switch 10 is closed continuously for three seconds or more one time, the manual ejection possible mode and the prohibition mode can become a switching mode. When the ejection switch is closed one time, the mode becomes a manual ejection prohibition mode. When the ejection switch is closed twice, the mode may be made a manual ejection possible mode. A method of selecting, in accordance with the respective operation modes, of the combination of the closing period and the opened interval as in a Morse signal, without the above described restriction can be effective as the combination of the closing number of times and the period as the operating method of the ejection switch 10 for switching the program switch.

Although the description is effected with the use of the ejection switch as a first operation switch, a special switch for the operation mode setting use can be provided when the economical, design conditions are allowed, without the above described restriction if the switch is provided in a position which is easier in position to comparatively operate on the front, rear panel and so on. Further, switches may be such forms capable of the inputting operation to the apparatus control portion as noncontacts like, for example, an optical switch or a magnetic switch using a Hall effect, in addition to the provision of mechanical contacts.

A second embodiment of the present invention will be described with the use of the same FIG. 1. The construction is the same as the first embodiment. The ejection switch 10 is closed without across the other operations by a specific number of times and the condition becomes a selective condition enough to switch the operation mode with the same method as the first embodiment. The specific selection mode is selected with the ID switch 9. The specific mode is selected by the close of the ejection switch 10. If the ID switch 9 is set in 0, the condition becomes a selective condition of the optical disk specification mode and the fixed magnetic disk specification mode. When the ejection witch 10 is closed one time, the mode becomes a fixed magnetic disk specification mode. If the ejection switch is closed twice, the mode becomes an optical disk specification mode. When the ID switch 9 is set in 1, the manual ejection possible mode and the prohibition mode becomes a switching mode. When the ejection switch is closed one time, the mode becomes a manual ejection prohibition mode. When the ejection switch is closed twice, the mode becomes a manual ejection possible mode.

As in the first embodiment, the program switch is changed over with the position of the above described ID switch and the number of times of closing the ejection switch as the operating method of the ejection switch 10 of changing over the program switch which is the changing over means within the apparatus control portion after the selection condition. It is possible to change over, in accordance with the respective operation mode, the position of the ID switch and the period of keeping closing the ejection switch. Assume that the ID switch 9 is set to 0, and the ejection switch 10 is closed for one second with the optical disk specification mode and the fixed magnetic disk specification mode being selected, and the mode becomes a fixed magnetic disk specification mode. If the ejection switch is closed for three seconds, the mode becomes an optical disk specification mode. Assume that the ID switch 9 is set to 1, and the ejection switch is closed for one second with the manual ejection possible mode and the prohibition mode being made a change over mode, and the mode becomes a manual ejection prohibition mode. If the ejection switch is closed for three seconds, the selecting operation can be effective with the closing period of the manual ejection possible mode. It is clear likewise that the combination of the closing number of times and the closing period can be used.

The first operation switch is described hereinabove with the use of the ejection switch. The restriction is not effected to the above description if the switches are disposed in positions easier to operate, front, rear panel or the like. When the economic, design conditions are allowed, a special switch for operation mode setting use can be provided as in the first embodiment. It is clear that the ID switches can be provided when the positions of the contacts can be decided if they are change-over multiple contacts, a switch of one contact is arranged by plurality. Both the ejection switch and the ID switches are not restricted to mechanical contacts. Non contacts in as optical switches and magnetic switches using the Hall effects, or the like may be used. The inputting operation to the apparatus control portion has only to be effective in form.

The selection condition can be provided when the ejection switch is closed at constant number of times constant period or different period by a method of a selection mode where the specific period is continuously closed when it is not caused by the normal operation of approximately three through five seconds except for the close by specific number of times, or the combination of the above described methods, as a operating method of the ejection switch 10 as a first operation switch for making the selection condition of the operation mode in both the first embodiment and the second embodiment. As the other method, the selection condition is provided by the application of the operation supply switch while the ejection switch 10 is being closed. The combination of the number of times and period for closing the ejection switch at the operation application and after the operation application can be added. What requires care in the selection condition of the operation mode of the apparatus is to try not to make the selecting condition with too simple method so as to avoid the confusion of the users, because there is such a function as not required at the normal operation time.

Figure 7:
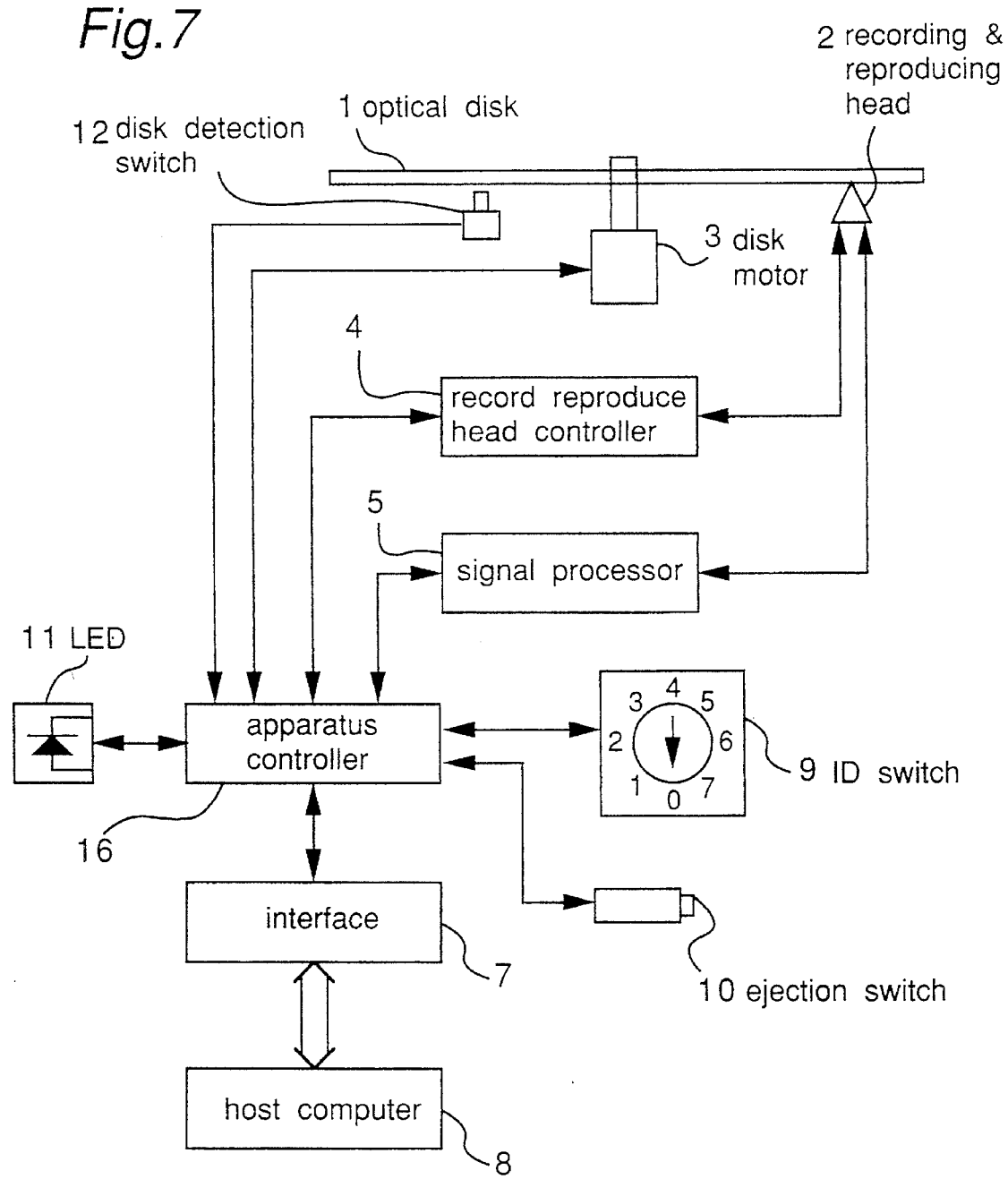
FIG. 7 is a block diagram of an optical disk recording, reproducing apparatus in the third embodiment of the present invention.

A third embodiment of the present invention will be described with the use of FIG. 7. Reference number 11 is a LED for display use, reference number 12 is a disk detection switch for detecting whether or not the disk has been correctly engaged within the apparatus, reference number 16 is an apparatus control portion. The others are the construction in construction as the first embodiment. The condition becomes selective by the operations of the ejection switch and the operation supply switch as in the other embodiment. In addition, the mode becomes a specific section mode, so as to select the specific mode, by the insertion of a cleaning cartridge for cleaning an object lens of the optical head in the selection condition. The manual ejection possible mode and the prohibition mode becomes a change over mode by the insertion of, for example, a cleaning cartridge. When the ejection switch is closed once here and the mode becomes a manual ejection prohibition mode. When the ejection switch is closed twice, the mode can be made the manual ejection possible mode. Although the present embodiment is an embodiment using a disk detection switch instead of the ID switch, it is clear that the combination of the ID switch and the other switch can be used.

Another characteristic of a third embodiment is that the mode to select is displayed by the lighting condition of the LED in the specific selection mode. In the selection condition of, for example, the optical disk specification mode and the fixed magnetic disk specification mode, the LED is lit in the optical disk specification mode and the LED is not lit if the mode is in a fixed magnetic disk specification mode. In a mode for changing over the manual injection possible mode and the prohibition mode, the LED is lit if the mode is the manual ejection prohibition mode, and the LED is not lit if the mode is the manual ejection possible mode. Application can be effective even to an example where the ID switch as in the first embodiment is not used if the flashing period of the LED, the LED of multiple colors such as two colors or three colors of LED are corresponded to many modes. The setting confirmation of the operator can be made corrector and simpler in this manner. Although 7 segment LED is useful to indicate the selected mode.

The selection condition of the program switch of the operation mode set in this manner is retained in a nonvolatile memory 6-5 shown in FIG. 2 within the apparatus control portion 6, and is operated in an operation mode set even when the operation supply is put to work again. The restoring operation to a condition of effecting the recording, reproducing operations of the information from the above described selecting condition may release the selection condition by the turning off operation of the operation supply switch. When no change is provided for about few minutes after the completion of the respective switch operations, the selection condition may be released by a method that the operation mode setting operation has been made certain, by a constant period lapse, so as to restore to the operation as the normal information recording, reproducing apparatus. Further, the selection condition may be released by the specific number of times, period or the closing way of the combination of the ejection switch.

The present invention does not restrict the retaining means of the operation mode. For example, ROM capable of electrically erasing, storing operations, battery backed up RAM and information recording medium an so on can be considered a usable retaining means.

Figure 8:
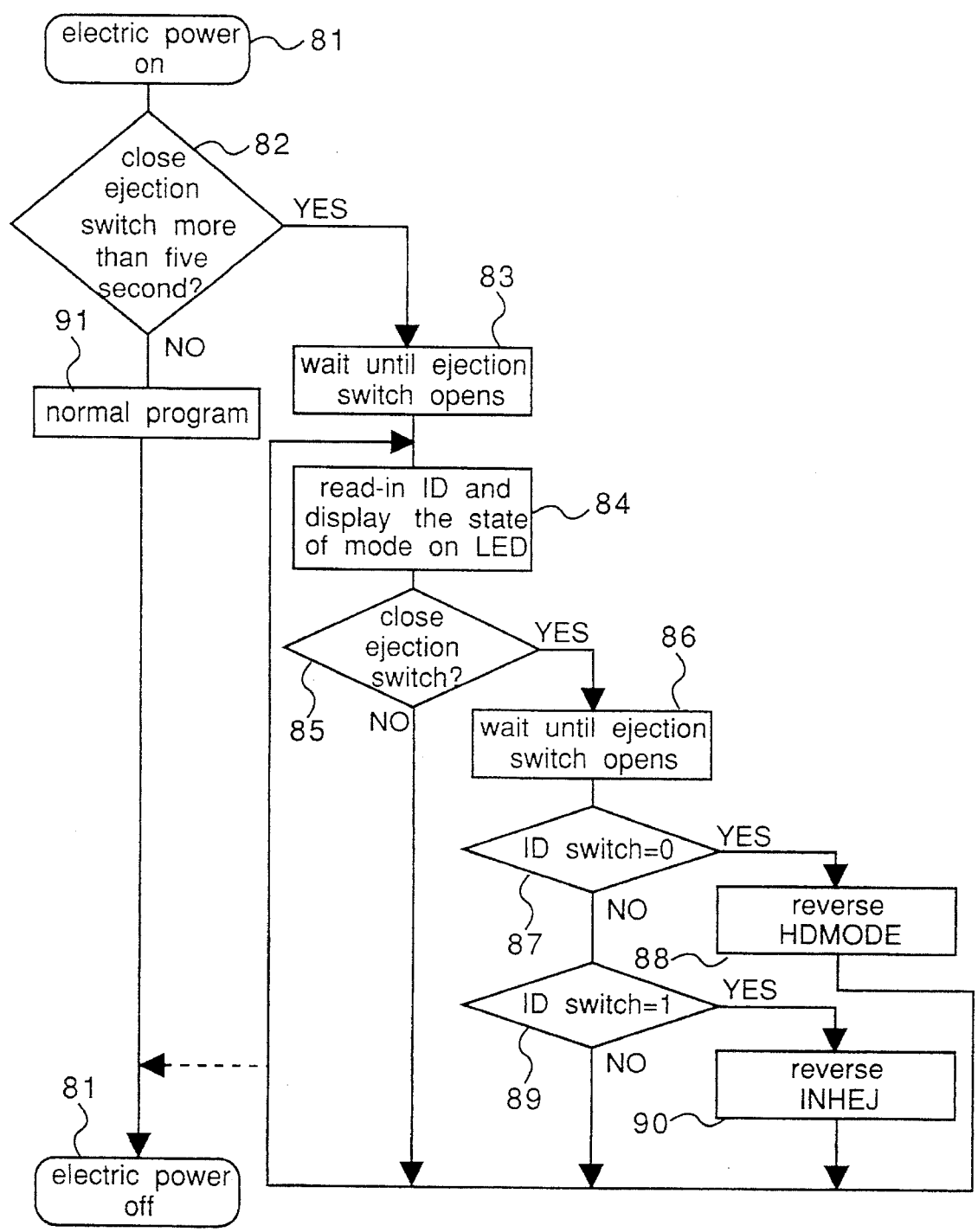
FIG. 8 is a flow chart of an operation mode selection in the third embodiment of the present invention.

FIG. 8 is an operation explaining view of the selection condition of a program memory. An operation of the mode selection program will be described with the use of FIG. 8. When it is judged that the ejection switch is closed for five seconds or more at a step 82 after the operation application at a step 81 in FIG. 8, the mode moves to a mode selection processing operation from a step 83 to a step 90. When it is judged that the ejection switch is not closed for five second or more at a step 82, the step advances to a step 91 so as to execute the normal program. When the mode moves to the mode selection processing operation from the step 83, it is waited till the ejection switch is opened at the step 83. Then, at a step 84, the condition of the ID switch is read out so as to display on the LED11 the selection condition of the mode corresponding to the condition. In this case, as the condition is the selection condition of the fixed magnetic disk specification mode and the optical disk specification mode if the ID switch is 0, the LED11 is lit when the mode is set in the fixed magnetic disk specification mode, and the LED11 is lit off when the mode is set in the optical disk specification mode. What is judged that the ejection switch is closed at the step 85, it is waited until the ejection switch is released at a step 86. When it is judged that the ejection switch is not closed at the step 85, the step returns to a step 84. When it is judged that the contents of the ID switch is 0 at a step 87 after the step 86, the HDMODE which is a program switch of the fixed magnetic disk specification mode and the optical disk specification mode at the step 88 is inserted. If the inversion is set to 1 if it is 0. It means that the inversion is set to 0 if it is 1. When it is judged that the content of the ID switch is not 0 at a step 87, the step advances to a step 89. When it is judged that the content of the ID switch is 1 at the step 89, the INHEJ which is a program switch for switching the permission and prohibition mode of the manual ejection at the step 90 is reverted. When it is judged that the content of the ID switch is not 1 at the step 89, the step advances to a step 84. After the execution at a step 88 or 90, the step returns to a step 84 so as to repeat the processing from the step 84. The above description is the operation mode selection operation within the apparatus control portion.

The selection mode in the present embodiment has been described with the use of the two operation modes of the switching operation of the optical disk specification mode and the fixed magnetic disk specification mode, and the switching operation of the manual ejection permission and prohibition. The switching operation of the specification corresponding to the general OS and the specification corresponding to the specific OS of the specification maker, the polarity switching operation of the ID switch of changing over the reading operation of the ID switch with positive logic or negative logic, what can require the connection change of the information recording, reproducing apparatus and the superior control appliance can be all corresponded without the restriction to the above description.

A mode of reading out the information from the optical disk is provided in the above decried operation mode with the recording operation being effected in a portion showing the above described operation mode or with all the control program portions on the specific portion of the optical disk of the present embodiment. When the reading mode is selected, the necessary information is automatically read out. It can be used in the replacement of the control program of the information recording, reproducing apparatus itself.

Figure 9:
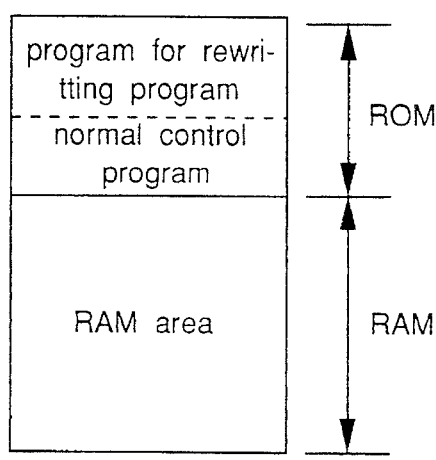
FIG. 9 is a memory arrangement view within the apparatus control portion in a fourth embodiment of the present invention.
Figure 11:
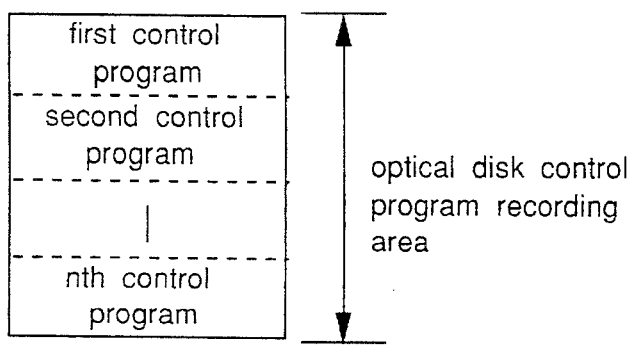
FIG. 11 is a block diagram within an optical disk in the fourth, fifth embodiments of the present invention.
Figure 12:
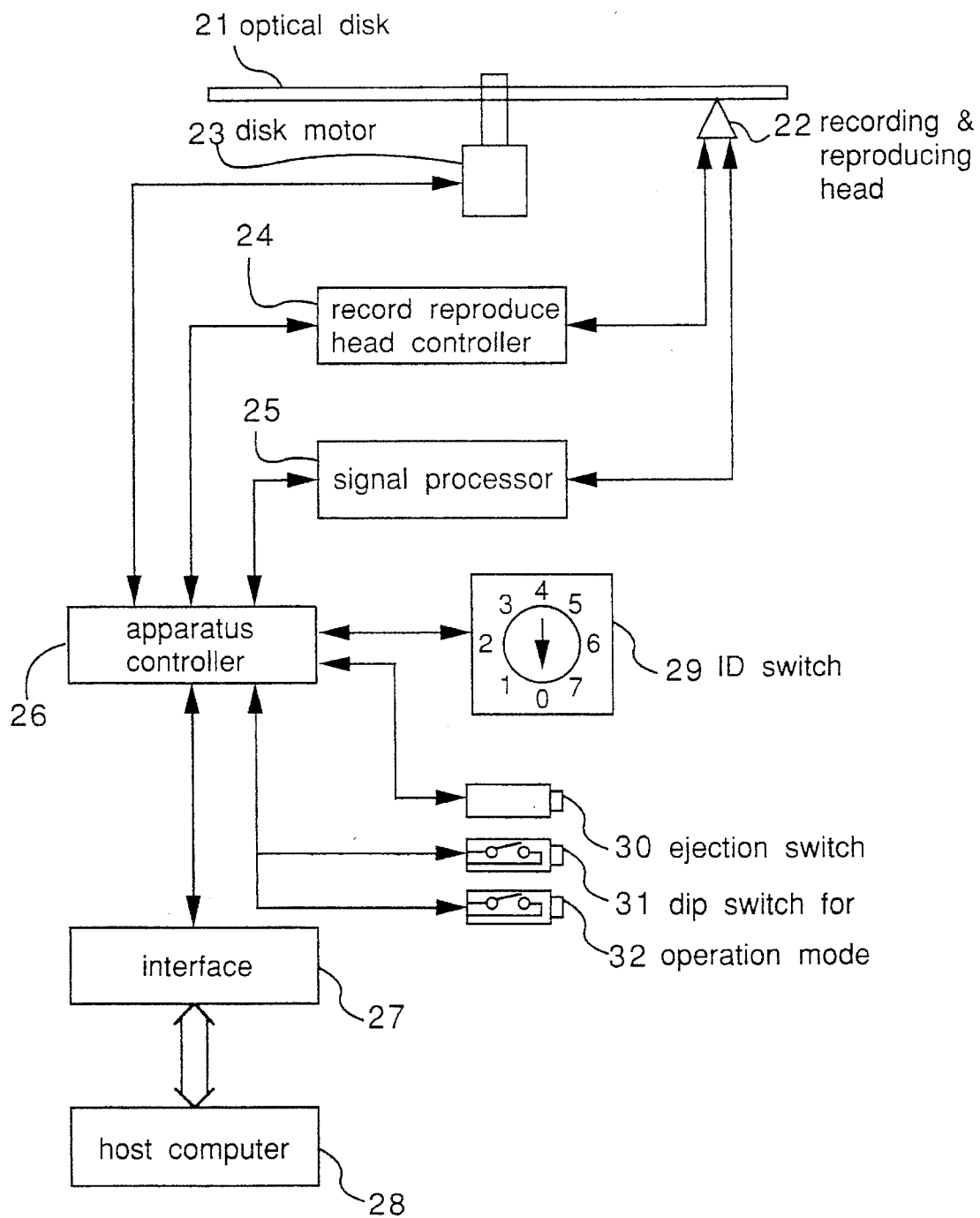
FIG. 12 is a block diagram of an optical disk recording, reproducing apparatus having the conventional mode switching means.
Figure 13:
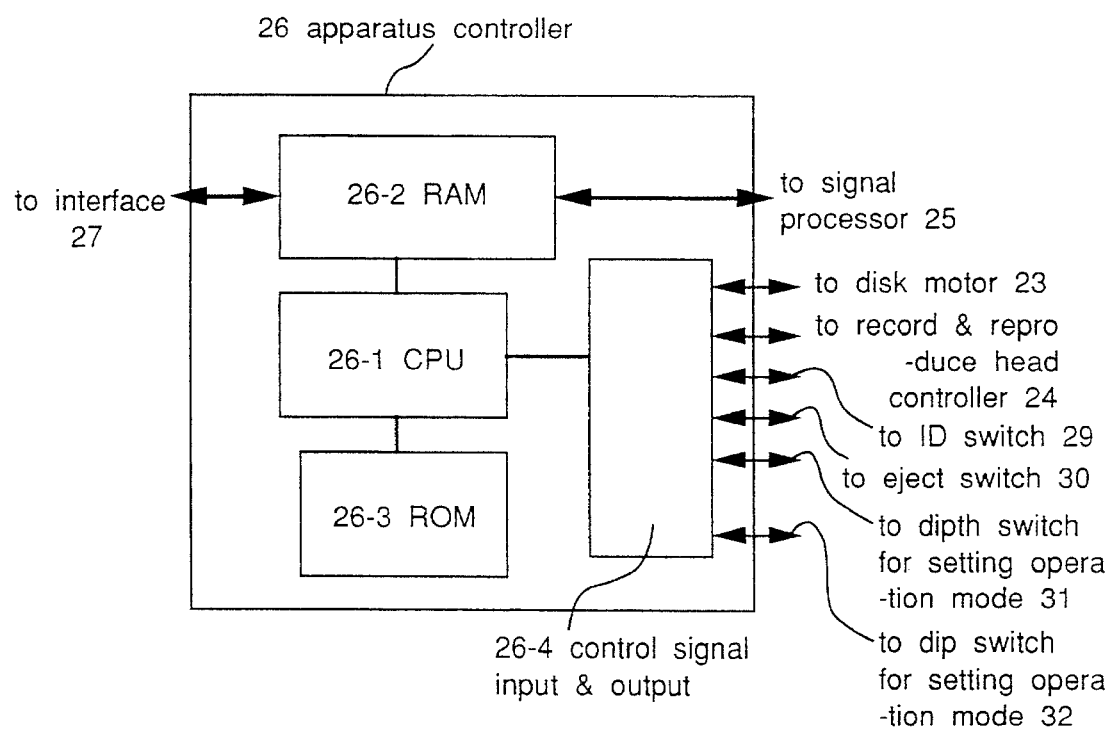
FIG. 13 is a detail block diagram of the apparatus control portion in the conventional embodiment.

A fourth embodiment of the present invention will be described hereinafter with the use of FIG. 2, FIG. 7, FIG. 9 and FIG. 11. Reference number 11 of FIG. 7 is a LED for displaying use, reference number 12 is a disk detecting switch for detecting the correct engagement of the optical disk within the apparatus, reference number 16 is an apparatus control portion. The others are the same construction as the first embodiment. FIG. 9 shows the memory arrangement of the program memory and the data memory in the present embodiment. The ROM area is composed of a program rewriting program and the normal control program. The RAM area is used for data buffer use. FIG. 11 is a chart showing the arrangement condition of a control program recorded in a specific area on the optical disk. The above described program rewriting program which has a means of reading out the control program recorded in the above described media and a means for changing the control program of the above described information recording, reproducing apparatus into the control program read out from the above distributed information recording medium. In the fourth embodiment constructed like this, the program rewriting program becomes effective by the operations of the ejection switch and the operation supply switch as in the other embodiment. In addition, the optical disk with the control program of the information recording, reproducing apparatus being recorded on it in this condition is inserted into the above described information recording, reproducing apparatus so as to read the control program recorded on the specific area on a medium by the control program reading means of the program requiring program so that the common program of the ROM area can be changed into the control program read out from the media. One of the control programs to be preserved by plurality in the specific area of the optical disk in accordance with the value of the ID switch of the information recording, reproducing apparatus can be read out and changed. The program rewriting program set by the present apparatus is restored in writing next to the n-th control program of the optical disk before the selected control program is written on the ROM area in the case of the present invention. The program can be used as the change history of the control program, the control program can be changed again in the prior condition, the optical disk, instead of an apparatus for analysis use when failed can be used for analysis communication use.

Figure 10:
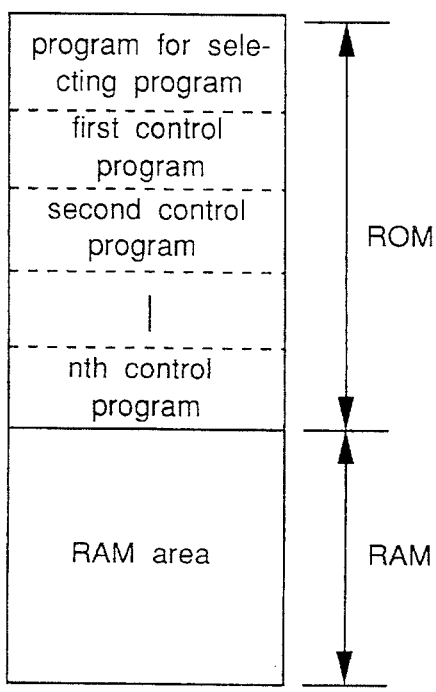
FIG. 10 is a memory arrangement view within the apparatus control portion in a fifth embodiment of the present invention.

A fifth embodiment of the present invention will be described with the use of FIG. 10. FIG. 10 shows the memory arrangement of the program memory and the data memory in the present embodiment. The ROM area is composed of a program selection program and a plurality of control programs. The RAM area is used for data buffer use. The information recording, reproducing apparatus can be used with the optimum control software for the OS of the host computer by the selection of any one from the control programs preserved by a plurality in types in the ROM area by the start of the program selection program with the specific instructions from the host computer which is the superior control apparatus in the fifth embodiment constructed like this. The present embodiment is not restricted to the contents of the instructions from the host computer. As the means of the instructions, the instructions may be effective with the use of the original command to be provided for with, for example, the SCSI interface. The reading out command to the specific area of the optical disk from the host computer may be used. Although the example where a plurality of control programs are preserved in the ROM area is described in the present embodiment, any one of a plurality of control programs to be preserved in the specific area on the media with the instructions from the host computer is read out by the combination of the present embodiment and the fourth embodiment of the present invention so that the program may be changed into the normal control program.

The correspondence to the operation mode, unexpected at present, which is considered to be caused in the cases where, for example, the new OS has been proposed may be effective by the above described construction. The kind of application for usage of the information recording, reproducing apparatus can be enlarged considerably without the replacement of the whole apparatus. An epoch-making apparatus which can guarantee the benefits of the users for a long period can be realized by the development in information appliance field keen in competition changes.

Although the embodiment of the present invention is described with the use of the information recording, reproducing apparatus using the optical disk, it is clear without restriction to it that the development into the apparatuses having similar functions of disk shaped magnetic recording media having similar shape, the other shape of information recording media such as card, tape or the like may be effective.

As it is clear from the foregoing description, in an information recording, reproducing apparatus which is connected with the superior control apparatuses, and is adapted to record, reproduce the information on the information recording medium, one operation mode is selected from a plurality of operation modes with the operation steps for controlling the information recording, reproducing operation by the operation of a first operation switch or by the operations of first, second operation switches being stored on them. The operation mode matched to the superior control apparatus can be stored, executed. Many operation modes can be effective without arrangement of the dip switch or a jumper switch for mode switching use on the apparatus printed circuit board. As the operation mode switching operation can be effective without taking out of the apparatus main chassis by opening operation of the sheathing case of the apparatus, a corresponding operation to many types of superior types of machines can be effective by extremely simple operations such as closing number of times and period of the first or second operation switch, arrangement and so on, extremely larger effects in the expanding operation of the kind of application for usage of the apparatus can be exhibited.

The control program for realizing the operation mode to be selected, which is recorded in the specific position of the optical disk that is the recording medium, is prepared. The condition is made specific by the operation of the first operation switch or the first and second operation switches. The control program recorded on the optical disk can be selectively corresponded to the operation mode unexpected at present by the change in the control program of the reading apparatus.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, to a first operation switch for instructing a predetermined ordinary operation of the information recording, reproducing apparatus, means, coupled to the recording and reproducing means, for storing a plurality of operation modes having operation steps for controlling the recording, reproducing of the information with instructions from the control apparatus, selecting means for selecting a selection mode from among the plurality of operation modes, apparatus control means, coupled to the first operation switch, for monitoring the operation of said first operation switch, and also for controlling the information recording, reproducing apparatus, and switching means, coupled to the first operation switch and the selecting means, for selecting an alternative optional operation mode from the plurality of operation modes in response to a number of times the first operation switch is activated by an instruction other than for instructing said predetermined ordinary operation when the selection mode is selected, the activation of the first operation switch detected by the apparatus control means.

2. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, means, coupled to the recording and reproducing means, for storing a plurality of operation modes having operation steps for controlling the recording, reproducing of the information with instructions from the control apparatus, selecting means for selecting a selection mode from among the plurality of operation modes, apparatus control means, coupled to the first operation switch, for monitoring the operation of said first operation switch, and also for controlling the information recording, reproducing apparatus, and switching means, coupled to the first operation switch and the selecting means, for selecting an alternative optional operation mode from the plurality of operation modes in response to a period of time the first operation switch is operated by an instruction other than for instructing said predetermined ordinary operation when the selection mode is selected, the period of time detected by said apparatus control means.

3. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, means, coupled to the recording and reproducing means, for storing a plurality of operation modes having operation steps for controlling the recording, reproducing of the information with instructions from the control apparatus, selecting means for selecting a selection mode from among the plurality of operation modes, apparatus control means, coupled to the first operation switch, for monitoring the operation of said first operation switch, and also for controlling the information recording, reproducing apparatus, and switching means, coupled to the first operation switch and the selecting means, for selecting an alternative optional operation mode from the plurality of operation modes in response to (a) a number of times the first operation switch is activated and (b) a period of time the first operation switch is activated, by an instruction other than for instructing said predetermined ordinary operation when the selection mode is selected, the activation of the first operation switch detected by said apparatus control means.

4. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, means, coupled to the recording and reproducing means, for storing a plurality of operation modes having operation steps for controlling the recording, reproducing of the information with instructions from the control apparatus, selecting means for selecting a selection mode from among the plurality of operation modes, apparatus control means, coupled to the first operation switch, for monitoring the operation of said first operation switch, and also for controlling the information recording, reproducing apparatus, switching means, coupled to the first operation switch and the selecting means, for selecting an alternative optional operation mode from the plurality of operation modes in response to the operation of the first operation switch by an instruction other than for instructing said predetermined ordinary operation when the selection mode is selected, and an operation switch for activating the operation of the information recording, reproducing apparatus where the selection mode is selected by operating the first operation switch for a constant period of time after activating the operation of the information recording, reproducing apparatus, the activation of the first operation switch detected by said apparatus control means.

5. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, a second operation switch, means, coupled to the recording and reproducing means, for storing a plurality of operation modes having operation steps for controlling the recording, reproducing of information with instructions from the control apparatus, an apparatus control means, coupled to the first and second operating switches, for monitoring the operation of the first and second operating switches and, for controlling the information recording, reproducing apparatus, selecting means, coupled to the second operation switch, for selecting a selection mode from among a plurality of operation modes in response to the operation of the second operation switch, switching means, coupled to the selection means and the first operation switch, for selecting an alternative operation mode from the plurality of operation modes in response to the operation of the first operation switch by an instruction other than for instructing said predetermined ordinary operation when the selection mode is selected, and an operation switch for activating the operation of the information recording, reproducing apparatus where the selection mode is selected by operating the first operation switch for a constant period of time after activating the operation of the information recording, reproducing apparatus, the activation of the first operation switch detected by said apparatus control means.

6. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, means, coupled to the recording and reproducing means, for storing a plurality of operation modes having operation steps for controlling the recording, reproducing of the information with instructions from the control apparatus, selecting means for selecting a selection mode from among the plurality of operation modes in response to the operation of the first operation switch for (a) a constant period of time and (b) a constant number of times, apparatus control means, coupled to the first operation switch, for (1) monitoring the operation of said first operation switch, (2) detecting the activation of the first operation switch, and (3) controlling the information recording, reproducing apparatus, and switching means, coupled to the first operation switch and the selecting means, for selecting an alternative optional operation mode from the plurality of operation modes in response to the operation of the first operation switch by an instruction other than for instructing said predetermined ordinary operation when the selection mode is selected.

7. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, means, coupled to the recording and reproducing means, for storing a plurality of operation modes having operation steps for controlling the recording, reproducing of the information with instructions from the control apparatus, selecting means for selecting a selection mode from among the plurality of operation modes, apparatus control means, coupled to the first operation switch, for monitoring the operation of said first operation switch, and also for controlling the information recording, reproducing apparatus, switching means, coupled to the first operation switch and the selecting means, for selecting an alternative optional operation mode from the plurality of operation modes in response to the operation of the first operation switch by an instruction other than for instructing said predetermined ordinary operation when the selection mode is selected.

a recorded control program for controlling the information recording, reproducing apparatus, means, responsive to the first operation switch, for reading an information recording medium control program recorded on the information recording medium, and means, responsive to the first operation switch, for changing the recorded control program of the information recording, reproducing apparatus to the information recording medium control program when the information recording medium is disposed in the information recording, reproducing apparatus, wherein the first operation switch activates (1) the means for reading the information recording medium control program and (2) the means for changing the control program prior to disposing the information recording medium in the information recording, reproducing apparatus.

8. An information recording, reproducing apparatus as recited in claim 7, wherein the recorded control program is recorded on the recording medium prior to being changed to the information recording medium control program.

9. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, a second operation switch, means, coupled to the recording and reproducing means, for storing a plurality of operation modes having operation steps for controlling the recording, reproducing of information with instructions from the control apparatus, an apparatus control means, coupled to the first and second operation switches, for monitoring the operation of the first and second operation switches and, for controlling the information recording, reproducing apparatus, selecting means, coupled to the second operation switch, for selecting a selection mode from among a plurality of operation modes in response to the operation of the second operation switch, switching means, coupled to the selection means and the first operation switch, for selecting an alternative operation mode from the plurality of operation modes in response to the operation of the first operation switch by an instruction other than for instructing said predetermined ordinary operation when the selection mode is selected, a recorded control program for controlling the information recording, reproducing apparatus, means, responsive to the first operation switch, for reading an information recording medium control program recorded on the information recording medium, and means, responsive to the first operation switch, for changing the recorded control program of the information recording, reproducing apparatus to the information recording medium control program when the information recording medium is disposed in the information recording, reproducing apparatus, wherein the first operation switch activates (1) the means for reading the information recording medium control program and (2) the means for changing the control program prior to disposing the information recording medium in the information recording, reproducing apparatus.

10. An information recording, reproducing apparatus as recited in claim 9, wherein the recorded control program is recorded on the recording medium prior to being changed to the information recording medium control program.

11. An information recording, reproducing apparatus which is coupled to a control apparatus and is adapted to record, reproduce information on an information recording medium, the information recording, reproducing apparatus having ordinary operations, the information recording, reproducing apparatus comprising:

means for recording and reproducing the information on the information recording medium, a first operation switch for instructing a predetermined ordinary operation of the information recording, reproducing apparatus, a second operation switch, means, coupled to the recording and reproducing means, for storing a plurality of operation modes having operation steps for controlling the recording, reproducing of information with instructions from the control apparatus, apparatus control means, coupled to the first and second operation switches, for (1) monitoring the operation of the first and second operation switches, (2) detecting the activation of the first operation switch, and (3) controlling the information recording, reproducing apparatus, and selecting means, coupled to the second operation switch, for selecting a selection mode from among a plurality of operation modes in response to the operation of the second operation switch and the operation of the first operation switch for (a) a constant period of time and (b) a constant number of times, the activation of the first operation switch detected by said apparatus control means, switching means, coupled to the selection means and the first operation switch, for selecting an alternative operation mode from the plurality of operation modes in response to the operation of the first operation switch by an instruction other than for instructing said predetermined ordinary operation when the selection mode is selected.

12. A method of switching an operation mode of an information recording, reproducing apparatus coupled to a control apparatus and adapted to record, reproduce information on an information recording medium, said information recording, reproducing apparatus having a first operation switch for instructing an ordinary operation of the apparatus and selecting a selection mode of the apparatus, the method comprising the steps of:

selecting the selection mode from among a plurality of modes by operating a first operation switch by an instruction other than that for instructing said ordinary operation, selecting an alternative operation mode from a plurality of operation modes by operating the first operation switch after selection of the selection mode, setting a program change condition, in response to the operation of the first operation switch, for reading an information recording medium control program from the information recording medium and for changing the control program, inserting the information recording medium having the information recording medium control program into the information recording, reproducing apparatus, reading the information recording medium control program, and changing the control program to the information recording medium control program.

13. A method of switching an operation mode of an information recording, reproducing apparatus as recited in claim 12, further comprising the step of:

recording the control program on the information recording medium prior to changing the control program to the information recording medium control program.

14. A method of switching an operation mode of an information recording, reproducing apparatus coupled to a control apparatus and adapted to record, reproduce information on an information recording medium, the information recording, reproducing apparatus comprising a first operation switch for instructing an ordinary operation of the information recording, reproducing apparatus, a second operation switch, means for storing a plurality of operation modes with operation steps for controlling the information recording, reproducing apparatus with instructions from the control apparatus, and selecting means for selecting a selection mode of the apparatus, the method comprising the steps of:

selecting the selection mode from among a plurality of operation modes by operating the second operation switch, selecting an alternative operation mode, in response to the first operation switch by an instruction other than that for said ordinary operation, from the plurality of operation modes after the selection mode has been selected, setting a program change condition, in response to the operation of the first operation switch, for reading an information recording medium control program from the information recording medium and for changing the control program, inserting the information recording medium having the information recording medium control program into the information recording, reproducing apparatus, reading the information recording medium control program, and changing the control program to the information recording medium control program.

15. A method of switching an operation mode of an information recording, reproducing apparatus as recited in claim 14, further comprising the step of:

recording the control program on the information recording medium prior to changing the control program to the information recording medium control program.

* * * * *